US006413297B1

(12) United States Patent
Morgan et al.

(10) Patent No.: US 6,413,297 B1
(45) Date of Patent: Jul. 2, 2002

(54) METHOD AND APPARATUS FOR TREATING PRESSURIZED DRILLING FLUID RETURNS FROM A WELL

(75) Inventors: Theodore Allen Morgan, Reedham (GB); David Speed; Carel Willem Jan Hoyer, both of Calgary (CA)

(73) Assignee: Northland Energy Corporation (CA)

( * ) Notice: Subject to any disclaimer, the term of this patent is extended or adjusted under 35 U.S.C. 154(b) by 0 days.

(21) Appl. No.: 09/626,857

(22) Filed: Jul. 27, 2000

(51) Int. Cl.[7] .............................................. B01D 19/00
(52) U.S. Cl. .............................. 95/22; 95/23; 95/248; 95/258; 95/259; 95/261; 96/174; 96/183; 96/189
(58) Field of Search .......................... 95/22, 23, 243, 95/248, 254, 258, 259, 261; 96/156, 183, 184, 189

(56) References Cited

U.S. PATENT DOCUMENTS

| | | | |
|---|---|---|---|
| 2,757,582 A | * | 8/1956 | Freeman et al. .......... 95/261 X |
| 2,852,091 A | | 9/1958 | Boudreaux |
| 2,886,287 A | | 5/1959 | Croley |
| RE27,882 E | * | 1/1974 | Burnham, Sr. ................ 95/248 |
| 4,344,774 A | * | 8/1982 | Skipper ..................... 95/261 X |
| 4,388,087 A | | 6/1983 | Tipton ............................ 55/96 |
| 4,397,659 A | * | 8/1983 | Gowan et al. ................. 95/248 |
| 4,737,168 A | * | 4/1988 | Heath ....................... 95/260 X |
| 5,053,082 A | | 10/1991 | Flanigan ..................... 134/25.1 |
| 5,090,498 A | | 2/1992 | Hamill ......................... 175/206 |
| 5,344,570 A | | 9/1994 | McLachlan ................. 210/709 |
| 5,415,776 A | | 5/1995 | Homan ........................ 210/519 |
| 5,570,749 A | | 11/1996 | Reed ............................ 175/66 |
| 5,775,442 A | | 7/1998 | Speed .......................... 175/48 |
| 5,900,137 A | | 5/1999 | Homan ......................... 210/85 |
| 5,928,519 A | * | 7/1999 | Homan ..................... 96/156 X |
| 6,132,494 A | * | 10/2000 | Kjos et al. ................. 95/261 X |

OTHER PUBLICATIONS

"Wellcom Technology", 2 page CALtec brochure, undated.
"WELLSEP", 2 page CALtec brochure, undated.
"WELLCOM–Oil", 2 page CALtec brochure, undated.

* cited by examiner

Primary Examiner—Robert H. Spitzer
(74) Attorney, Agent, or Firm—Merek & Voorhees

(57) ABSTRACT

A method and apparatus for treating pressurized drilling fluid returns from a well having a returns outlet. The method comprises the steps of providing a primary separator for selectively separating solid, liquid and gas components of the drilling fluid returns where the primary separator has an input for introducing drilling fluid returns thereto; providing a secondary separator for selectively separating at least a portion of a gas component in the drilling fluid returns where the secondary separator has an input for introducing drilling fluid returns thereto; connecting the input of the primary separator and the input of the secondary separator to the returns outlet of the well such that the input of the secondary separator is connected to the well returns outlet upstream of the input of the primary separator; providing a control to regulate the flow of drilling fluid returns through the input of the primary and secondary separators; monitoring the flow of the gas component of the drilling fluid returns expelled from the primary separator; and, in response to changes in the flow of gas expelled from the primary separator, operating the control to regulate the flow of drilling fluid returns through the primary and secondary separators to maintain the flow of gas expelled from the primary separator within predetermined parameters.

25 Claims, 3 Drawing Sheets

METHOD AND APPARATUS FOR TREATING PRESSURIZED DRILLING FLUID RETURNS FROM A WELL

FIELD OF THE INVENTION

This invention relates to a method and apparatus for treating pressurized drilling fluid returns from a well, and in particular a method of extracting a portion of the gas component of the drilling fluid returns.

BACKGROUND OF THE INVENTION

When drilling a well, whether it be through the use of overbalanced, balanced or underbalanced drilling techniques, pressurized drilling fluid returns must be extracted from the well and treated for purposes of separating, recycling, processing or otherwise disposing of the fluids and their constituent parts. Depending upon the nature of the drilling process being utilized and the geology through which the well is drilled, the drilling fluid returns may include a wide variety of solid, liquid and gas components, such as oil, water, rock particulates, natural gas and other hydrocarbon gases, etc. Regardless of the particular drilling operation, the drilling fluid returns extracted from a well can be at a relatively high pressure when compared to atmospheric conditions. The composition and pressure of the returns therefore necessitate that they be treated and separated before further use or disposal.

To date others have suggested a wide variety of different techniques and devices that may be used to treat pressurized drilling fluid returns. Such devices function to varying degrees of efficiency and, to a large extent, have their own specific advantages and disadvantages.

In spite of the various and different techniques that have been proposed for treating pressurized drilling fluid returns, prior devices and methods continue to suffer from a number of common and inherent limitations that severely effect their application, efficient operation, and cost. For example, in a closed high pressure separation system a significant problem that is commonly faced is one of erosion of parts of the system. This occurs when solid particles, in combination with gases and liquids, contact system components as they are propelled and travel through various piping and pressure vessels. The incidence and rate of erosion is accelerated by disturbances in flow patterns that may be caused by changes in flow area and direction, or through passage through valves, orifices or similar structures that cause pressure drops. Typically erosion will be most dramatic directly downstream of such a disturbance. Where high pressure drilling fluid returns are being processed and separated, erosion of piping or other structural elements can present a significant safety concern due to the potential for ruptures or failures of eroded parts. Erosion has the affect of significantly adding to the cost of a treatment system for pressurized drilling fluid returns due to the necessity for increased replacement of damaged components, and due to increased down-time when such components must be replaced.

A second limitation of presently known treatment systems concerns the inability to effectively and economically deal with high volumes of gas separated from drilling returns. In most instances separated gas returns cannot be easily stored, and are usually at lower pressures than production or sales pipelines. For this reason the separated gases are most often sent to flare. Flaring the gas is economically wasteful and environmentally undesirable. If low pressure gas is recovered from a separator, it must be sent to a gas compression system to increase its pressure to pipeline or process pressures, thereby adding to both capital and operating expense.

To combat situations where a large volume of gas is expelled from a well (for example when drilling through high deliverability gas zones) prior art systems and devices are typically constructed with a size and capacity that far exceeds the normal daily output from the well. This practice presents yet a third significant limitation under the prior art as over sizing separation devices in such a manner adds to the capital and operating costs of land based drilling systems. In addition, the sheer size and weight of such prior art systems in many cases also severely limits their application to offshore drilling projects.

Further, prior methods of treating drilling returns often involve monitoring liquid levels upstream of the choke that feeds a primary separation vessel as a means of regulating gas flow through the system. However, where the well expels a large quantity of liquid at one time (referred to as a liquid slug) such liquid monitoring methods are typically overloaded and fail, resulting in a liquid carryover into the gas stream. In addition, once again the size of such currently used systems results in increased costs and limited application in offshore drilling.

SUMMARY OF THE INVENTION

The invention therefore provides a method of treating pressurized drilling fluid returns from a well that helps to address some of the deficiencies in the prior art. The invention provides a method of treating such drilling fluid returns in a manner that reduces erosion of component parts of the system, enhances the ability to recover and utilize separated gas components at wellhead pressures from the returns, and that allows for the use of more compact equipment than many prior art devices, thereby helping to minimize capital costs and enhancing utilization in both land and offshore applications.

Accordingly, in one of its aspects the invention provides a method of treating pressurized drilling fluid returns from a well having a returns outlet, the method comprising the steps of providing a primary separation means for selectively separating solid, liquid and gas components of the drilling fluid returns, said primary separation means having input means for introducing drilling fluid returns thereto; providing a secondary separation means for selectively separating at least a portion of a gas component in the drilling fluid returns, said secondary separation means having input means for introducing drilling fluid returns thereto; connecting said input means of said primary separation means and said input means of said secondary separation means to the returns outlet of the well, said input means of said secondary separation means connected to the well returns outlet upstream of said input means of said primary separation means; providing control means to regulate the flow of drilling fluid returns through said input means of said primary separation means and through said input means of said secondary separation means; monitoring the flow of the gas component of the drilling fluid returns expelled from said primary separation means; and, in response to changes in the flow of gas expelled from said primary separation means, operating said control means to regulate the flow velocity of drilling fluid returns through said primary and said secondary means to thereby maintain the flow of gas expelled from said primary separation means within predetermined parameters.

In a further aspect the invention provides a method of treating drilling fluid returns from a pressurized source, said drilling fluid returns containing at least one of a gas component, a liquid component and a solid component, the method comprising the steps of; connecting a primary separator and a secondary separator to the source of pressurized drilling fluid returns, said secondary separator connected to the source of drilling fluid returns upstream of said primary separator; providing at least one flow controller to regulate the flow of drilling fluid returns through said primary and said secondary separators; monitoring the volume of the gas component of the drilling fluid returns separated by said primary separator; and, operating said flow controller to regulate the flow velocity of drilling fluid returns through said primary and said secondary separators in response to changes in the volume of gas separated from said drilling fluid returns by said primary separator to maintain the volume of gas separated from said drilling fluid returns by said primary separator within pre-determined parameters.

In yet a further aspect the invention provides an apparatus for treating pressurized drilling fluid returns from a pressurized source, said drilling fluid returns containing at least one of a gas component, a liquid component and a solid component, the apparatus comprising; a primary separator having an input port for introducing drilling fluid returns therein, and having at least one gas output port; a secondary separator having an input port for introducing drilling fluid returns therein, and having at least one gas output port; at least one flow controller to regulate the flow of drilling fluid returns through said primary and said secondary separators; at least one flow meter to monitor, and to generate a signal pursuant to, the volumetric flow of the gas component of the drilling fluid returns separated by said primary separator; and, a system controller, said system controller regulating the operation of said flow controller in response to signals generated by and received from said flow meter to thereby regulate the flow of drilling fluid returns through said primary and said secondary separators in response to changes in the volume of any gas separated from said drilling fluid returns by said primary separator and to thereby maintain the volume of any gas separated by said primary separator within pre-determined parameters.

Further aspects and advantages of the invention will become apparent from the following description taken together with the accompanying drawing.

BRIEF DESCRIPTION OF THE DRAWINGS

For a better understanding of the present invention, and to show more clearly how it may be carried into effect, reference will now be made, by way of example, to the accompanying drawing which shows the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
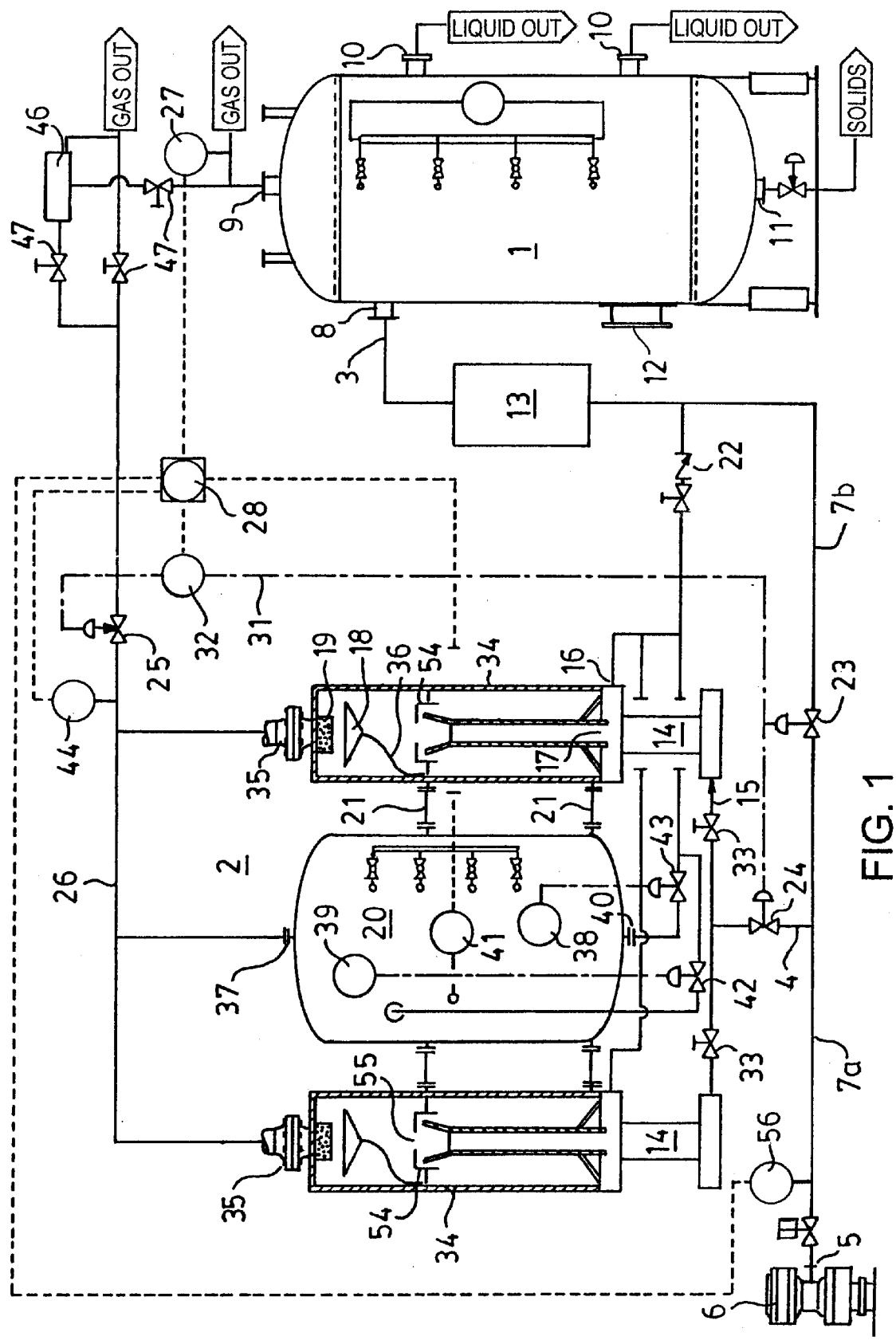
FIG. 1 is a schematic drawing showing the flow circuit and component parts of a drilling fluid returns treatment system pursuant to the practice of the method of the present invention.

Referring to FIG. 1, there is depicted therein a schematic drawing showing a flow circuit, and it's component parts, that may be utilized to practice the method of the present invention. In FIG. 1 there is provided a primary separation means or primary separator 1 and a secondary separation means or secondary separator 2. Primary separation means 1 has input means 3 to introduce pressurized drilling fluid thereto. Similarly, secondary separation means 2 contains input means 4 to also allow the introduction of pressurized drilling fluid returns therein.

Input means 3 and 4 are connected to a returns outlet 5 of a well or wellhead 6 such that input means 4 of secondary separator 2 is connected to well returns outlet 5 upstream of input means 3 of primary separator 1. It will be appreciated by those skilled in the art that a wide variety of different mechanisms and manners of physically connecting the respective input means with the well returns outlet could be utilized while staying within the broad scope of the invention. It is expected that in most instances rigid piping of a type commonly used on a drilling system will be used to physically connect each of primary separator 1 and secondary separator 2 to the returns outlet 5 of the well. In FIG. 1 this piping, which may be referred to as the primary well returns line, is identified by reference numerals 7a and 7b. In the preferred embodiment input means 4 and secondary separation means 2 are connected to the returns outlet upstream of separation means 1. As is also shown in FIG. 1, the feed for secondary separation means 2 is preferably taken off primary well returns line 7b upstream of a high pressure choke valve or manifold 13.

In the preferred embodiment primary separation means 1 comprises a vertical or horizontal separation vessel, similar to those commonly used in the industry. Such vessels generally allow for the separation of solid, liquid and gas components of drilling fluid returns through differences in specific gravities of components of the drilling fluid. In their simplest form such separation vessels comprise settling tanks that may include a series of baffles, weirs or specific separation devices (typically located downstream of the high pressure choke manifold) to assist in physical phase separation of the drilling fluid components. As shown in the attached drawing, primary separation means 1 comprises a vertical separation vessel wherein input means 3 comprises an input port 8. Since the vessel receives pressurized drilling fluid returns, it is constructed in the form of a pressure vessel that is designed to function at pressures commonly encountered in a drilling operation. As drilling fluid returns enter separation means 1 through port 8, the fluid tends to separate into its constituent solid, liquid and gas phases. The gas phase may then be extracted from the top of the vessel through gas output port 9, whereas any liquid and solid phases may be extracted through liquid output ports 10 and solid output port 11. In the embodiment shown in FIG. 1, two liquid output ports are shown to permit the separate extraction of water and lighter oils and hydrocarbons, if the two liquid phases are present in the returns. For service and cleaning purposes, primary separation means 1 may also be equipped with a manway 12.

The flow through separation means 1 must be controlled so as to not overload the vessel with returns abnormally high in solids, liquids or gases. In such circumstances efficient separation may not occur and more than one phase component may be extracted through a particular output port. For these two primary reasons high pressure choke valve 13 is typically incorporated into well returns line 7b, upstream of primary separation means 1. Choke 13 may be fixed or may be manually or automatically adjustable to control both the pressure and volume of drilling fluid returns entering separation means 1.

In the preferred embodiment secondary separation means 2 includes two separation vessels 14 connected in a parallel relationship. However, it will be appreciated that depending upon the conditions of a particular well, the volume of returns generated, the relative percentages of solid, liquid and gaseous phases in those returns, and a desired amount of built-in redundancy within the secondary separation means, one, two, three or more separation vessels 14 could equally be used. Valves 33 are used to close off the flow to individual separation vessels 14 where the extra capacity provided by multiple vessels is not required, or for purposes of maintenance and repair.

Whereas primary separation means 1 generally comprises a relatively standard vertical or horizontal separation vessel, vessel 14 is preferably a smaller, high pressure, bulk separator whose primary purpose is to separate at least a portion of the gas component in the drilling fluid returns from any liquid and solid components. Vessel 14 is also preferably located upstream of high pressure choke manifold 13. The separation of the gas component in separation vessel 14 is preferably accomplished through high velocity cyclonic or centrifugal separation (see FIG. 2). Examples of commercially available separators that may be utilized in these regards include the I-SEP and the HI-SEP separators manufactured by The BHR Group Limited.

Figure 2:
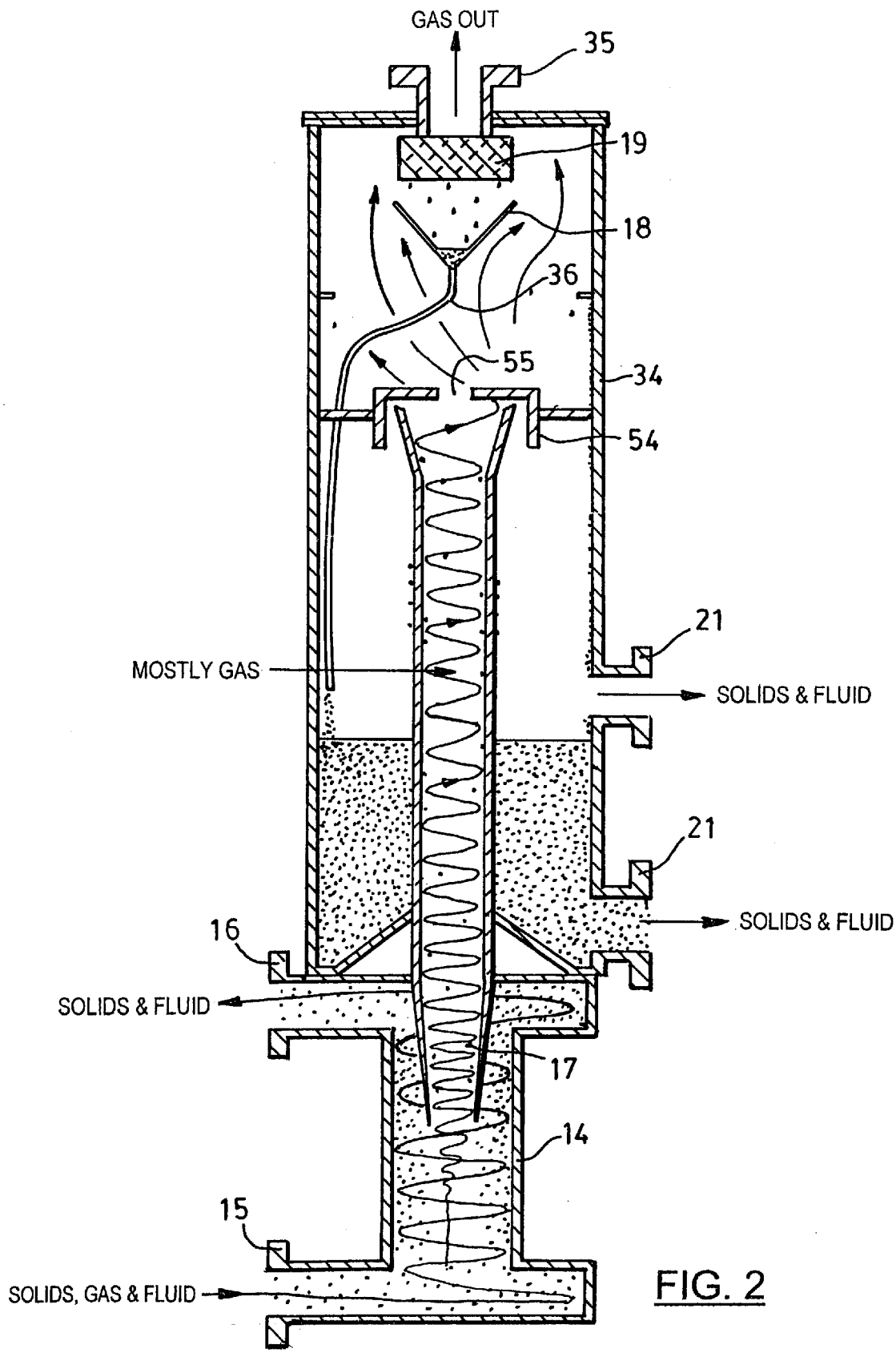
FIG. 2 is a cross-sectional schematic view of a secondary separation vessel employed pursuant to the method of the present invention; and, FIG. 3 is a cross-sectional schematic view of a jet pump as employed pursuant to one embodiment of the present invention.

In FIGS. 1 and 2 a preferred embodiment of separation vessel 14 is shown. In this embodiment separation vessel 14 has an inlet 15, a liquid and/or solid output port 16, and a gas output 17. In operation, as high pressure drilling returns enter vessel 14 the cyclonic action of the vessel causes the formation of a vortex that drives at least a portion of the gas contained within the drilling returns through output 17 while any solids, liquids and additional gas exit through output port 16. Fluid exiting through output port 16 is dumped back into well returns line 7b, upstream of high pressure choke 13. A check valve 22 is preferably utilized to prevent back flow from line 7b.

Even though separation vessel 14 operates with reasonable efficiency at wellhead pressures, there will be a tendency for liquid droplets (and possibly some solid particulate matter) to be carried upwardly and expelled through gas output port 17. For this reason, in the preferred embodiment a knockout vessel 34 is positioned downstream of separation vessel 14 to help remove any liquids or solids entrained in the gas stream exiting vessel 14. Knockout vessel 34 will thereby help to prevent carry over of liquid or solids into gas process lines. As shown in the attached drawing, knockout vessel 34 is a generally hollow vessel with a gas outlet 35 at its upstream end. Gas outlet 35 is connected to gas process stream piping 26 to direct the gas to a desired location.

As fluid from vessel 14 passes into knockout vessel 34, the centrifugal forces cause the liquid droplets to collect on the inside surfaces of the vessel and pool in its bottom. To further reduce the likelihood of liquid being carried through gas outlet 35, knockout vessel 34 includes a funnel or deflector 18 that prevents the direct impingement of the gas stream on outlet 35. A skirted shroud 54, having a reduced concentric flow orifice 55, is also incorporated within vessel 14 to further help prevent liquid carryover into gas outlet 35 in the event of liquid slugging. The likelihood of small droplets of liquid being carried into gas outlet 35 is yet further reduced through the use of a demister 19 at gas output 35. Liquid that collects on demister 19 drips into funnel 18 and is thereafter directed to the lower portions of separation vessel 14 through a pipe 36.

As separation vessel 14 is of a relatively small size and designed for high through-put, secondary separation means 2 may also include a liquid/solid containment vessel 20. Containment vessel 20 provides additional capacity for secondary separation means 2 and acts as a buffering means for controlling the flow of liquids and solids therefrom. Containment vessel 20 is connected to knockout vessel 34 by way of pressure equalization conduits 21. Preferably a pair of equalization conduits are used, the first positioned at the lower end of the knockout vessel and the second located at a higher elevation. Through conduits 21, fluid within knockout vessel 34 is able to freely flow into containment vessel 20 such that the pressures within the two vessels are approximately the same. Gas that accumulates within vessel 20 can be removed through an upper gas exit port 37, also connected to gas process stream piping 26.

The inventive method of the present invention further includes the step of providing at least one control means or flow controller to regulate the flow of drilling fluid returns through primary separation means 1 and secondary separation means 2. In the preferred embodiment such control means includes a control valve 23, positioned between returns outlet 5 and primary separation means 1, and a control valve 24, positioned between returns outlet 5 and secondary separation means 2. Valves 23 and 24 allow for full flow to be directed to separation means 1 or, alternatively, allow for flow to initially be directed through separation means 2 and then onto separation means 1. In the embodiment depicted in FIG. 1, valves 23 and 24 are connected to well returns line 7b and control the feed or input into primary separator 1 and secondary separator 2. A third control valve 25 may be placed within gas process stream piping 26. Control valve 25 may be used to regulate the flow of gas from secondary separator 2.

The specific operation of the method according to the present invention will now be discussed in greater detail. When well 6 first begins to produce pressurized drilling fluid returns, control valve 24 is fully closed while control valve 23 is fully open allowing well returns line 7b to deliver pressurized drilling fluid returns from returns outlet 5 to input port 8 of primary separation means 1. As discussed above, prior to entering the primary separation means, the returns will pass through a high pressure choke 13 causing a pressure drop. For example, typical pressures of drilling fluid returns from a well can be in the range of 100 to 1000 psi whereas the pressures within primary separation means 1, downstream of high pressure choke 13, are typically between 50 and 200 psi.

As drilling fluid returns are fed into primary separation means 1, they are separated into their constituent solid, liquid and gaseous phases. Under the method of the present invention, the flow of the gas component of the drilling fluid returns that is extracted from primary separation means 1 is monitored so that system controls can be operated to regulate the flow velocity of drilling fluid returns through the primary and secondary separation means. In this way the flow of gas from primary separation means 1 can be maintained within predetermined parameters.

In the preferred embodiment, the flow of gas from primary separation means 1 is monitored through placement of a flow meter 27 in gas output port 9 (or downstream of output port 9). Flow meter 27 generates flow volume signals that are sent to a system controller 28 for analyzing and comparison with predetermined values. Operating in conjunction with flow meter 27 is a pressure sensor 56, preferably located in well returns line 7a upstream of valves 23 and 24, that monitors well pressure. Pressure sensor 56 generates a well pressure signal that is also sent to system controller 28. It is expected that in most cases system controller 28 would be comprised of a microprocessor or other programmable control device. Typically the flow volume and well pressure signals would be electrical signals, however, it will be appreciated by those skilled in the art that an equivalent pneumatic or hydraulic system of monitoring and signaling could equally be utilized.

Microprocessor control 28 operates to regulate control valves 23, 24 and 25 in order to maintain the flow of gas exiting primary separation means 1 within predetermined or pre-programed parameters. For example, as the rate of gas flowing out of primary separation vessel 1, as measured by flow meter 27, approaches a preset rate (for example one to five million standard cubic feed per day) flow meter 27 will generate a signal that is sent to microprocessor control 28. In response to the signal received from flow meter 27, and in conjunction with well pressure signals generated by pressure sensor 56, microprocessor control 28 will cause control valve 24 to begin to open while control valve 25 remains fully closed. This will have the result of forcing drilling returns to begin to enter secondary separation means 2. When control valve 24 becomes fully open control valve 23 will close thus routing all pressurized drilling fluid returns through secondary separation means 2. Once control valve 23 is fully closed, microprocessor control 28 causes control valve 25 to begin to open to "bleed" off enough gas to maintain the predetermined gas flow rate through primary separation means 1, using the signal generated by pressure sensor 56 as the primary control with flow meter 27 acting as an override control. That is, through monitoring well pressure with sensor 56 the microprocessor control is able to divert drilling fluid returns through primary and secondary separators 1 and 2 in such a fashion to maintain a desired minimum gas flow through separator 1 with excess gas flow directed through secondary separator 2, while at the same time helping to prevent large fluctuations in well pressure and an increase in back pressure on the well. To that end the signal generated by sensor 56 represents a primary control signal utilized by microprocessor 28. However, if flow meter 27 should detect a drop in the flow of gas from separator 1 below pre-determined values the signal from flow meter 27 will override the signal from sensor 56 and divert more returns to primary separator 1 to maintain the gas throughput through partial closure of valve 25. It will therefore be appreciated that the well pressure signal from sensor 56 and the flow signal from meter 27 are used in conjunction to control the inlet fluid velocities to ensure optimum performance of secondary separator 2, to reduce flow velocities below erosion critical velocity downstream of choke manifold 13, and to help maintain a minimum gas output from primary separator 1. Primary control through sensor 56 will also give the operator the advantage of regulating well back-pressure.

When control valve 23 is fully closed control valve 25 will be at least partially open allowing a portion of the gas component of the pressurized drilling fluid returns coming from the well to be extracted by secondary separation means 2. The remainder of the gas component, together with any solid or liquid components, will be forced out of secondary separation means 2, through high pressure choke 13, and into primary separation means 1. Allowing control valve 25 to open slightly such that only a portion of the gas is "bled" off will effectively result in an inefficient separation of the gas component of the drilling returns in secondary separation means 2, with a portion of the gas flowing from secondary separation means 2 into primary separation means 1. In the event of increasing gas volumes in the returns, as determined by an increased flow through gas output port 9, opening control valve 25 further will result in the separation of more gas from the pressurized drilling fluid returns within secondary separation means 2. Similarly, partially closing or restricting control valve 25 will have the result of decreasing the amount of gas extracted by secondary separation means 2, forcing more of the drilling fluid returns from secondary separation means 2 into primary separation means 1 and thereby maintaining or increasing the volume of gas expelled from separation means 1 depending upon the amount of gas in the returns.

If control valve 25 becomes completely closed (for example at the onset of a liquid slug), and the flow of expelled gas from primary separation means 1 drops below a pre-determined value (for example 0.5 to 2 million standard cubic feet per day), microprocessor control 28 will cause control valve 23 to once again open and control valve 24 to close, thereby routing all drilling fluid returns back through primary separation means 1.

As mentioned, containment vessel 20 generally serves as a buffering means to control the production and flow of liquids and/or solids from knockout vessel 34. One of the primary functions of vessel 20 is to prevent the carry over of liquid into the gas process stream, particularly during the onset of a liquid slug. The method of operation of containment vessel 20 will now be described in more detail.

As liquid accumulates in knockout vessel 34 it will flow through one or both of conduits 21 and into containment vessel 20. Vessel 20 is preferably equipped with a low level controller 38 and a high level controller 39. Under most operating conditions only low level controller 38 will be active. Low level controller 38 regulates a lower level dump valve 43 that allows fluid within the vessel to be dumped through a lower exit port 40 to well returns line 7b, upstream of choke 13. Should an increasing liquid phase in the drilling returns be encountered, the liquid level in vessel 20 will eventually reach a point at which a liquid level transmitter 41 will be activated. At that point liquid level transmitter 41 sends a signal to microprocessor control 28 that effectively overrides any signal that may be received from flow meter 27 or pressure sensor 56. Acting upon the signal from liquid level transmitter 41, microprocessor 28 causes control valve 25 to begin to close. If the liquid level in vessel 20 continues to rise it will reach high level controller 39 which sends a further signal to microprocessor control 28 causing valve 25 to close completely. At the same time, a high level dump valve 42 will be opened to allow for the removal of additional liquid from the vessel and the delivery of that liquid to well returns line 7b, once again upstream of choke valve 13. In the preferred embodiment, high level dump valve 42, and the piping that connects it to well returns line 7b, is of a sufficient size to accommodate liquid quantities such as those that may be experienced in the case of a liquid slug. Finally, as the liquid level in vessel 20 begins to fall the above procedure reverses itself with gas again being separated and extracted from knockout vessel 34.

As a further safeguard against the possibility of liquid carry over into the gas process stream from secondary separation means 2, a pressure sensor 44 may be positioned in piping 26. Pressure sensor 44 monitors the pressure in piping 26 and sends a signal to microprocessor 28. If the pressure should fall below pre-determined levels, microprocessor 28 will again override any signal from flow meter 27 and close valve 25.

As described above, microprocessor control 28, upon receipt of various signals from system meters and controls, causes an appropriate opening or closing of control valves 23, 24 and 25, and to maintain the flow of gas from primary separation means 1 within predetermined parameters. The microprocessor also helps prevent carry over of liquid into the gas process stream. In the embodiment of the invention shown in FIG. 1, valves 23, 24 and 25 are pneumatically or hydraulically operated by means of air or hydraulic fluid delivered through piping 31. The pressurization of pneumatic or hydraulic fluid supplied to valves 23, 24 and 25 is accomplished through the use of a pneumatic or hydraulic pump and flow control system 32. When adjustment of one or more of control valves 23, 24 and 25 is required, microprocessor control 28 generates an electrical signal that is sent to pump and flow control system 32. Pump and flow control system 32 then provides the necessary pneumatic or hydraulic pressure required to open a particular valve, or, alternatively, bleeds off pressure supplied to a valve allowing it to be partially or fully closed. Such a system enables flow control valves 23, 24 and 25 to be automatically adjusted without the direct use of electrical contacts and/or solenoids. Where explosive gases are concerned, the minimization of electrical controls is desirable. It will, however, be appreciated by those skilled in the art that a variety of other pneumatic, hydraulic, electrical, and/or mechanical control mechanisms could be utilized in order to automatically open and close control valves 23, 24 and 25 while still remaining within the broad scope of the invention.

The gas component separated from the drilling fluid returns by secondary separation means 2 may be disposed of in a variety of different ways. First, as in the traditional methods employed in the separation of drilling fluid returns, the gas may be sent to flare. Secondly, where the gas is natural gas, it may be sent to a processing plant and/or injected into a gas or sales pipeline. Depending upon the pressure of drilling fluids coming from the well, such gas may already be at pipeline pressure allowing it to be injected directly into the "sales line" or high pressure gas "gathering line". In cases where the pressure of gas expelled from secondary separation means 2 is less than pipeline pressure, the gas may be sent to a compression stage for appropriate pressurization. Since the separation within secondary separation means 2 occurs at high pressures (as opposed to the lower pressures in primary separation means 1) the relative increase in pressure required to bring such gas to pipeline pressure will be considerably less than if attempting to bring gas expelled from primary separation means 1 up to pipeline pressure. Accordingly, the cost of compression equipment, and its operation, are less.

As a third alternative, gas expelled from secondary separation means 2 may be sent to a compressor for compressing to re-injection pressure so that a portion may be returned to the well. Once again, since gas extracted from secondary separation means 2 will be at a relatively high pressure the amount of compression required to bring it up to re-injection pressure (typically 1000 to 2000 psi) is minimized. Re-injecting recovered high pressure gas also limits the amount of make-up gas that is needed to be injected into the well, thereby providing yet a further economic benefit.

A further embodiment of the inventive method includes the step of extracting a portion of the low pressure gas expelled from primary separation means 1 and combining that gas with the high pressure gas expelled from secondary separation means 2. In so doing at least a portion of the low pressure gas from primary separation means 1, that in many cases would be simply sent to flare, may be recovered. Recovery of the low pressure gas is advantageous from an economic perspective since the gas can be later utilized or sold, and also from an environmental perspective due to a reduction in the burning or release of hydrocarbons.

It will be appreciated by those skilled in the art that the combination of the low and high pressure gases may be accomplished in a variety of different manners. In one preferred embodiment of the invention the task is accomplished through use of a jet pump 46. As shown in FIG. 1, jet pump 46 may be incorporated into gas process stream piping 26 such that through its operation part, or all, of the gas exiting primary separation means 1 through gas outlet port 9 is drawn into the jet pump and combined with the high pressure gas separated by secondary separation means 2. A series of valves 47 are preferably positioned within the piping connecting jet pump 46 to gas process stream piping 26, and within the output line from primary separation means 1, so that flow through the jet pump can be isolated or controlled for maintenance and other purposes.

Figure 3:
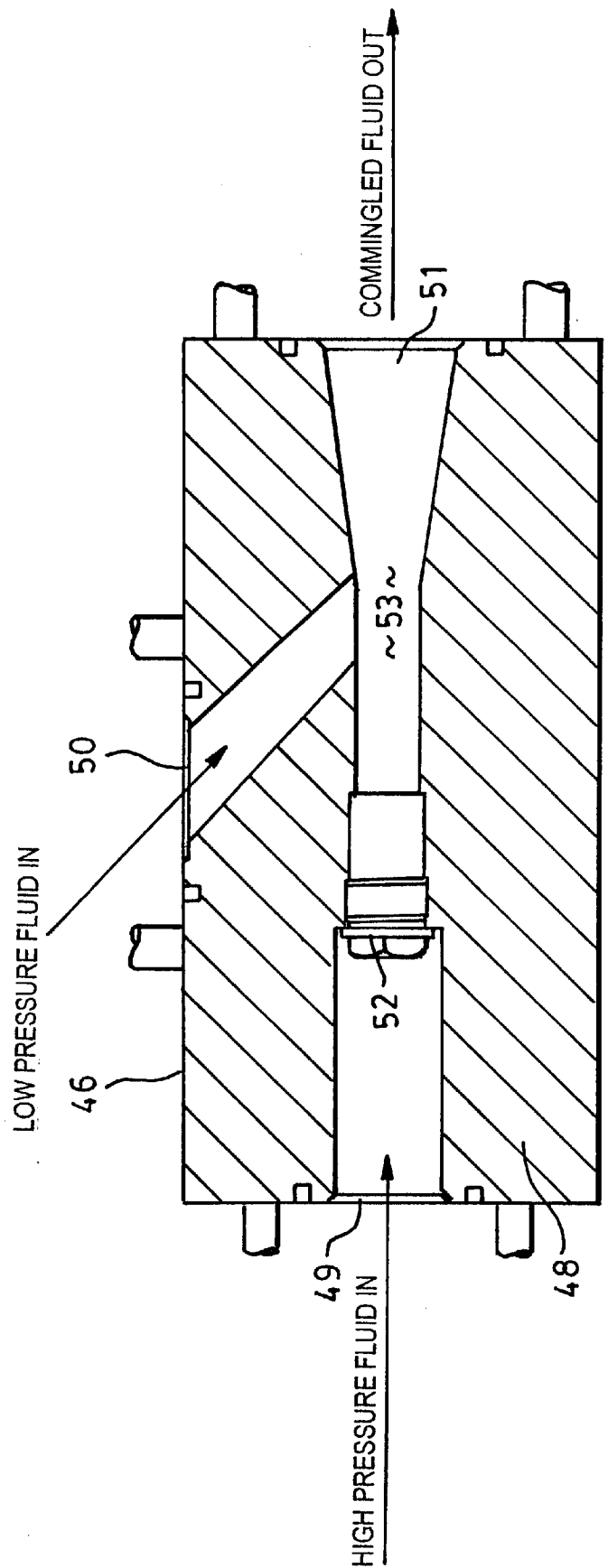

A typical internal configuration for jet pump 46 is shown schematically in FIG. 3. For simplicity of operation and minimization of cost, jet pump 46 preferably comprises a housing 48 having a high pressure input port 49, a low pressure input port 50, a commingled output port 51, and a flow restrictor 52. In operation, high pressure gas separated from the drilling fluid returns by secondary separation means 2 enters jet pump housing 48 through high pressure input port 49. As the gas proceeds through the housing it is forced through flow restrictor 52 which creates a zone 53 of reduced pressure downstream from the flow restrictor. This zone of reduced pressure effectively creates a partial vacuum or suction through which low pressure gas exiting primary separation means 1 can be drawn (and is allowed to flow) into housing 48 through low pressure input port 50. The two combined gas streams then exit housing 48 through commingled output port 51. At that point the commingled gas stream may be directed to flare, a compressor system for re-injection into the well, or to a sales line or high pressure gas gathering line.

Flow restrictor 52 is preferably comprised of a choke (for example a bean choke), nozzle, or other such flow restriction device, and may have a fixed or an adjustable orifice. Where the orifice is fixed, preferably the flow restrictor is threadably received within housing 48 such that the restrictor can be readily changed or replaced when worn, or to change the size of the orifice for different drilling applications. To accomodate constantly changing gas flow parameters during drilling, the flow restrictor may have an orifice that is adjustable by either local or remote mechanical or electromechanical means. In addition, pressure sensors may be placed in high pressure input port 49, low pressure input port 50, and/or output port 51 so that gas pressures can be measured at one or more locations. The signals from such pressure sensors would typically be directed to a microprocessor that would also be connected to the control means for the adjustable orifice in the flow restrictor. The microprocessor can then be used to control the size of the orifice in response to changes in gas pressures, thereby allowing jet pump 46 to automatically adapt to pressure changes and gas flow characteristics.

Finally, in yet a further embodiment, the function of control valve 25 within gas process stream piping 26 could be incorporated into jet pump 46. As described above, control valve 25, in conjunction with control valves 23 and 24, helps to regulate and maintain the flow of gas exiting primary separation means 1. Where flow restrictor 52 in jet pump 46 has an automatically adjustable orifice, the related control system and the adjustment of that orifice could effectively carry out the function of control valve 25 and allow valve 25 to be dispensed with. Alternately, where flow restrictor 52 has a fixed orifice, control valve 25 may be used as a means to help regulate the flow of gas through a jet pump 46, and to accommodate changing gas flow parameters without adjusting the size of the orifice in the flow restrictor.

Through an understanding of the present inventive method and apparatus it will be clear that a number of distinct advantages are provided over the prior art. First, erosion through the choke valve and primary separation vessel will be minimized by removing some of the gas from the drilling returns upstream of the choke. Secondly, removal of a portion of the gas phase from the returns upstream of the primary separation vessel allows for the use of a smaller primary separation vessel making the overall system less costly and more easily adaptable to offshore applications.

Since gas production rates typically fall immediately prior to the formation of a liquid slug, monitoring gas flow rates and pressures in the manner described allows for the anticipation of liquid slug arrival. In this way the system can be adjusted to handle the associated increased flow of liquid. Being able to predict and recognize the potential arrival of a liquid slug allows for process adjustments to be implemented immediately to prevent liquid carry over into the gas production stream.

A further advantage provided by the above method is that the centrifugal forces created within the cyclonic separation stage tends to break or partially break the gaseous phase out from the liquid phase in any foam that may be present in the drilling fluid returns. Further, removing a significant portion of the gas upstream of a major pressure drop reduces the potential for hydrate formation. The significant centrifugal forces also help coalesce the respective solids, hydrocarbons, water and gas phases which increase overall separation efficiencies. As eluded to above, there are also a number of economic advantages associated with extracting high pressure gas by way of secondary separator 2. In addition, through combining at least a portion of the high and low pressure gas streams with a jet pump, a greater percentage of the separated gas can be recovered providing added economic and environmental advantages.

Through use of the above inventive method and apparatus, flow and pressure can be used in conjunction to control fluid velocity and to regulate well back pressure within pre-determined levels. Velocity controls ensure optimum separation performance and a reduction in damage to system components through erosion. The regulation of upstream pressure allows the surface control system to produce a more stable well back pressure which is a requisite to successful pressure control drilling operations.

It is to be understood that what has been described are the preferred embodiments of the invention and that it may be possible to make variations to these embodiments while staying within the broad scope of the invention. Some of these variations have been discussed while others will be readily apparent to those skilled in the art. For example, in the embodiment shown in FIG. 1 primary separation means 1 comprises a vertically oriented separation vessel. However, primary separation means 1 could equally be a horizontal separation vessel while having no material effect upon the operation of the inventive method.

We claim:

1. A method of treating pressurized drilling fluid returns from a well having a returns outlet, the method comprising the steps of:

(i) providing a primary separation means for selectively separating solid, liquid and gas components of the drilling fluid returns, said primary separation means having input means for introducing drilling fluid returns thereto;

(ii) providing a secondary separation means for selectively separating at least a portion of a gas component in the drilling fluid returns, said secondary separation means having input means for introducing drilling fluid returns thereto;

(iii) connecting said input means of said primary separation means and said input means of said secondary separation means to the returns outlet of the well, said input means of said secondary separation means connected to the well returns outlet upstream of said input means of said primary separation means;

(iv) connecting said primary and said secondary separation means to the returns outlet of said well through the use of control valves to regulate the flow of drilling fluid returns through said input means of said primary separation means and through said input means of said secondary separation means;

(v) monitoring the flow of the gas component of the drilling fluid returns expelled from said primary separation means;

(vi) in response to changes in the flow of gas expelled from said primary separation means, operating said control valves to regulate the flow velocity of drilling fluid returns through said primary and said secondary separation means to thereby maintain the flow of gas expelled from said primary separation means within predetermined parameters;

(vii) conveying the solid and liquid components of the drilling fluid returns as separated by said secondary separation means to said input means of said primary separation means; and, (viii) monitoring the flow volume of the gas component of the drilling fluid returns expelled from said primary separation means through the use of a flow meter and utilizing said flow meter to generate a flow volume signal, said flow volume signal sent to a microprocessor for analyzing and comparison to a pre-determined flow value, thereafter using said microprocessor to actuate said control valves to maintain the flow of gas from said primary separation means within said pre-determined parameters and to control flow velocities.

2. The method as claimed in claim 1 including utilizing a pressure sensor at the returns outlet of the well and monitoring the pressure of drilling fluid returns from the well upstream of said secondary separation means.

3. The method as claimed in claim 2 including utilizing said pressure sensor to generate a well pressure signal, said well pressure signal sent to said microprocessor for analyzing and comparison to a pre-determined well pressure value, thereafter using said microprocessor to actuate said control valves to maintain the flow of gas from said primary separation means within said pre-determined parameters and to control flow velocities.

4. The method as claimed in claim 1 wherein said control valves are pneumatic, hydraulic or electrically controlled.

5. A method of treating pressurized drilling fluid returns from a well having a returns outlet, the method comprising the steps of:

(i) providing a primary separation means for selectively separating solid, liquid and gas components of the drilling fluid returns, said primary separation means having input means for introducing drilling fluid returns thereto;

(ii) providing a secondary separation means for selectively separating at least a portion of a gas component in the drilling fluid returns, said secondary separation means having input means for introducing drilling fluid returns thereto;

(iii) connecting said input means of said primary separation means and said input means of said secondary separation means to the returns outlet of the well, said input means of said secondary separation means connected to the well returns outlet upstream of said input means of said primary separation means;

(iv) providing control means to regulate the flow of drilling fluid returns through said input means of said primary separation means and through said input means of said secondary separation means;

(v) monitoring the flow of the gas component of the drilling fluid returns expelled from said primary separation means;

(vi) in response to changes in the flow of gas expelled from said primary separation means, operating said control means to regulate the flow velocity of drilling fluid returns through said primary and said secondary separation means to thereby maintain the flow of gas expelled from said primary separation means within predetermined parameters; and, (vii) extracting at least a portion of said gas component expelled from said primary separation means and combining with the gas component of said drilling fluid returns as separated by said secondary separation means.

6. The method as claimed in claim 5 including the further step of utilizing a jet pump to combine at least a portion of said gas expelled from said primary separation means with at least a portion of the gas component of said drilling fluid returns as separated by said secondary separation means.

7. The method as claimed in claim 6 wherein said jet pump includes a flow restrictor such that passage of at least a portion of the high pressure gas component from said secondary separation means through said flow restrictor causes the formation of a zone of reduced pressure within said pump, said zone of reduced pressure drawing into said pump at least a portion of the gas expelled from said primary separation means and resulting in a combination of said gas from said primary and said secondary separation means upon expulsion from said pump.

8. The method as claimed in claim 7 wherein said flow restrictor comprises a nozzle or choke having a fixed orifice.

9. The method as claimed in claim 7 wherein said flow restrictor comprises a nozzle or choke having an adjustable orifice.

10. The method as claimed in claim 9 wherein said orifice in said flow restrictor is adjustable to accommodate varying pressures and volumes of gas from said secondary separation means.

11. The method as claimed in claim 9 including the step of adjusting said orifice in said flow restrictor in response to varying pressures and volumes of gas from said secondary separation means and thereby maintaining the flow of gas expelled from said primary separation means within predetermined parameters.

12. A method of treating drilling fluid returns from a pressurized source, said drilling fluid returns containing at least one of a gas component, a liquid component and a solid component, the method comprising the steps of:

(i) connecting a primary separator and a secondary separator to the source of pressurized drilling fluid returns, said secondary separator connected to the source of drilling fluid returns upstream of said primary separator;

(ii) providing at least one flow controller to regulate the flow of drilling fluid returns through said primary and said secondary separators;

(iii) monitoring the volume of the gas component of the drilling fluid returns separated by said primary separator; and, (iv) operating said flow controller to regulate the flow velocity of drilling fluid returns through said primary and said secondary separators in response to changes in the volume of gas separated from said drilling fluid returns by said primary separator to maintain the volume of gas separated from said drilling fluid returns by said primary separator within pre-determined parameters.

13. The method as claimed in claim 12 including operating said flow controller to regulate the flow velocity of drilling fluid returns through said primary and said secondary separators in response to changes in the pressure of the drilling fluid returns upstream of said secondary separator.

14. The method as claimed in claim 13 wherein said secondary separator is connected to said source of pressurized drilling fluid returns upstream of a high pressure choke and said primary separator is positioned downstream of said high pressure choke, said primary separator thereby comprising a low pressure separator and said secondary separator thereby comprising a high pressure separator.

15. The method as claimed in claim 14 including the further step of directing any solid and liquid components of the drilling fluid returns as separated by said secondary separator to said primary separator.

16. A method as claimed in claim 15 wherein the volume of the gas component of the drilling fluid returns separated by said primary separator is monitored through the use of a flow meter, said flow meter generating a flow volume signal that is sent to a microprocessor for analyzing and comparison to a pre-determined value, in response to changes in said flow volume signal said microprocessor activating control valves connected to said primary and said secondary separators to maintain the flow of gas from said primary separator within pre-determined volumetric parameters.

17. The method as claimed in claim 14 wherein a jet pump is used to combine the gas component separated by said primary separator with the gas component separated by said secondary separator, said jet pump including a flow restrictor such that passage of at least a portion of the high pressure gas component separated by said secondary separator through said flow restrictor causes the formation of a zone of reduced pressure within said pump, said zone of reduced pressure drawing into said pump at least a portion of the gas separated by said primary separator and thereby combining said gases from said primary and said secondary separators.

18. The method as claimed in claim 17 wherein said flow restrictor comprises a nozzle or choke having an adjustable orifice.

19. The method as claimed in claim 12 including the further step of providing a secondary controller to regulate the flow of gas separated by said secondary separator.

20. The method as claimed in claim 12 including the further step of extracting at least a portion of the gas component of said drilling fluid returns separated by said primary separator and combining with the gas component of said drilling fluid returns as separated by said secondary separator.

21. An apparatus for treating pressurized drilling fluid returns from a pressurized source, said drilling fluid returns containing at least one of a gas component, a liquid component and a solid component, the apparatus comprising:

(i) a primary separator having an input port for introducing drilling fluid returns therein, and having at least one gas output port;

(ii) a secondary separator having an input port for introducing drilling fluid returns therein, and having at least one gas output port;

(iii) at least one flow controller to regulate the flow of drilling fluid returns through said primary and said secondary separators;

(iv) at least one flow meter to monitor, and to generate a signal pursuant to, the volumetric flow of the gas component of the drilling fluid returns separated by said primary separator; and, (v) a system controller, said system controller regulating the operation of said flow controller in response to signals generated by and received from said flow meter to thereby regulate the flow of drilling fluid returns through said primary and said secondary separators in response to changes in the volume of any gas separated from said drilling fluid returns by said primary separator and to thereby maintain the volume of any gas separated by said primary separator within predetermined parameters.

22. The apparatus as claimed in claim 21 including a high pressure choke, said secondary separator positioned upstream of said high pressure choke and said primary separator positioned downstream of said high pressure choke such that said primary separator comprises a low pressure separator and said secondary separator comprises a high pressure separator.

23. The apparatus as claimed in claim 22 including a jet pump connected to said gas output ports of said primary and said secondary separators, said jet pump including a flow restrictor such that passage of at last a portion of a high pressure gas component from said secondary separator through said flow restrictor causes the formation of a zone of reduced pressure within said pump, said zone of reduced pressure drawing into said pump at last a portion of a low pressure gas component from said primary separator and thereby combining said high and low pressure gas components from said primary and said secondary separators.

24. The apparatus as claimed in claim 23 wherein said flow restrictor comprises a nozzle or choke having an adjustable orifice.

25. The apparatus as claimed in claim 21 wherein said flow controller comprises one or more control valves connected to said input ports of said primary and said secondary separators, in response to signals received from said flow meter said system controller regulating said control valves and the flow of the drilling fluid returns through said primary and said secondary separators.

* * * * *